US012617237B2

(12) United States Patent
Noguchi

(10) Patent No.: US 12,617,237 B2
(45) Date of Patent: May 5, 2026

(54) MOTORCYCLE TIRE

(71) Applicant: Sumitomo Rubber Industries, Ltd., Kobe (JP)

(72) Inventor: Yoshihisa Noguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/923,754

(22) Filed: Oct. 23, 2024

(65) Prior Publication Data

US 2025/0135805 A1 May 1, 2025

(30) Foreign Application Priority Data

Nov. 1, 2023 (JP) .................................. 2023-187956

(51) Int. Cl.
| | |
|---|---|
| B60C 9/20 | (2006.01) |
| B60C 1/00 | (2006.01) |
| B60C 9/18 | (2006.01) |
| B60C 11/00 | (2006.01) |
| B60C 9/22 | (2006.01) |

(52) U.S. Cl.
CPC ............ B60C 9/18 (2013.01); B60C 11/0058 (2013.01); *B60C 2009/2051* (2013.01); *B60C 2009/2214* (2013.01); *B60C 2200/10* (2013.01)

(58) Field of Classification Search
CPC ........................ B60C 2200/10; B60C 11/0058
See application file for complete search history.

(56) References Cited

U.S. PATENT DOCUMENTS

| | | | | |
|---|---|---|---|---|
| 4,220,564 A | * | 9/1980 | Tanimoto ................. | C08K 3/06 |
| | | | | 524/255 |
| 9,631,075 B2 | * | 4/2017 | Sato ........................... | C08L 9/06 |
| 2018/0272806 A1 | * | 9/2018 | Hamanaka ................ | B60C 3/04 |
| 2022/0371373 A1 | * | 11/2022 | Ueda ........................ | B60C 9/10 |

FOREIGN PATENT DOCUMENTS

| | | | |
|---|---|---|---|
| JP | 10-53007 | * | 2/1998 |
| JP | 6946646 B2 | | 10/2021 |

* cited by examiner

*Primary Examiner* — Justin R Fischer

(74) *Attorney, Agent, or Firm* — XSENSUS LLP

(57) ABSTRACT

A motorcycle tire can include a tread portion, sidewall portions, bead portions, and a carcass. The tread portion can include a tread reinforcing layer and a tread rubber. The tread reinforcing layer can include a belt layer and a band layer. A development width of the band layer can be smaller than that of the belt layer. The tread rubber can include a crown rubber and shoulder rubbers. A hardness at 100° C. of each shoulder rubber can be higher than a hardness at 100° C. of the crown rubber, a complex elastic modulus at 100° C. of each shoulder rubber can be higher than a complex elastic modulus at 100° C. of the crown rubber, and a 300% modulus at 100° C. of each shoulder rubber can be higher than a 300% modulus at 100° C. of the crown rubber.

18 Claims, 4 Drawing Sheets

MOTORCYCLE TIRE

CROSS REFERENCE TO RELATED APPLICATION

The present application claims priority to Japanese patent application JP 2023-187956, filed on Nov. 1, 2023, the entire contents of which are incorporated herein by reference in its entirety.

BACKGROUND

Field

The present disclosure relates to a motorcycle tire.

Background Art

Japanese Patent No. 6946646 proposes a motorcycle tire including a tread reinforcing layer in a tread portion thereof. This tire is expected to improve cornering performance by specifying an angle of each belt cord included in the tread reinforcing layer with respect to the tire circumferential direction.

In recent years, as the performance of motorcycles and the like has been improved, there has been a growing demand for motorcycle tires to have further improved cornering performance and stability during braking.

SUMMARY

According to an aspect of the present disclosure, a motorcycle tire can include: a tread portion; a pair of sidewall portions; a pair of bead portions; and a carcass extending on and between the pair of bead portions, wherein the tread portion can include a tread reinforcing layer placed outward of the carcass in a tire radial direction, and a tread rubber placed outward of the tread reinforcing layer in the tire radial direction, the tread reinforcing layer can include a belt layer including a plurality of belt cords inclined with respect to a tire circumferential direction, and a band layer placed outward of the belt layer in the tire radial direction and including at least one band cord helically wound in the tire circumferential direction, a development width of the band layer can be smaller than a development width of the belt layer, the tread rubber can include a crown rubber placed in a region including a tire equator, and shoulder rubbers each placed outward of the crown rubber in a tire axial direction in a region including a tread edge, a hardness at 100° C. of each shoulder rubber can be higher than a hardness at 100° C. of the crown rubber, a complex elastic modulus at 100° C. of each shoulder rubber can be higher than a complex elastic modulus at 100° C. of the crown rubber, and a 300% modulus at 100° C. of each shoulder rubber can be higher than a 300% modulus at 100° C. of the crown rubber.

DETAILED DESCRIPTION

Figure 1:
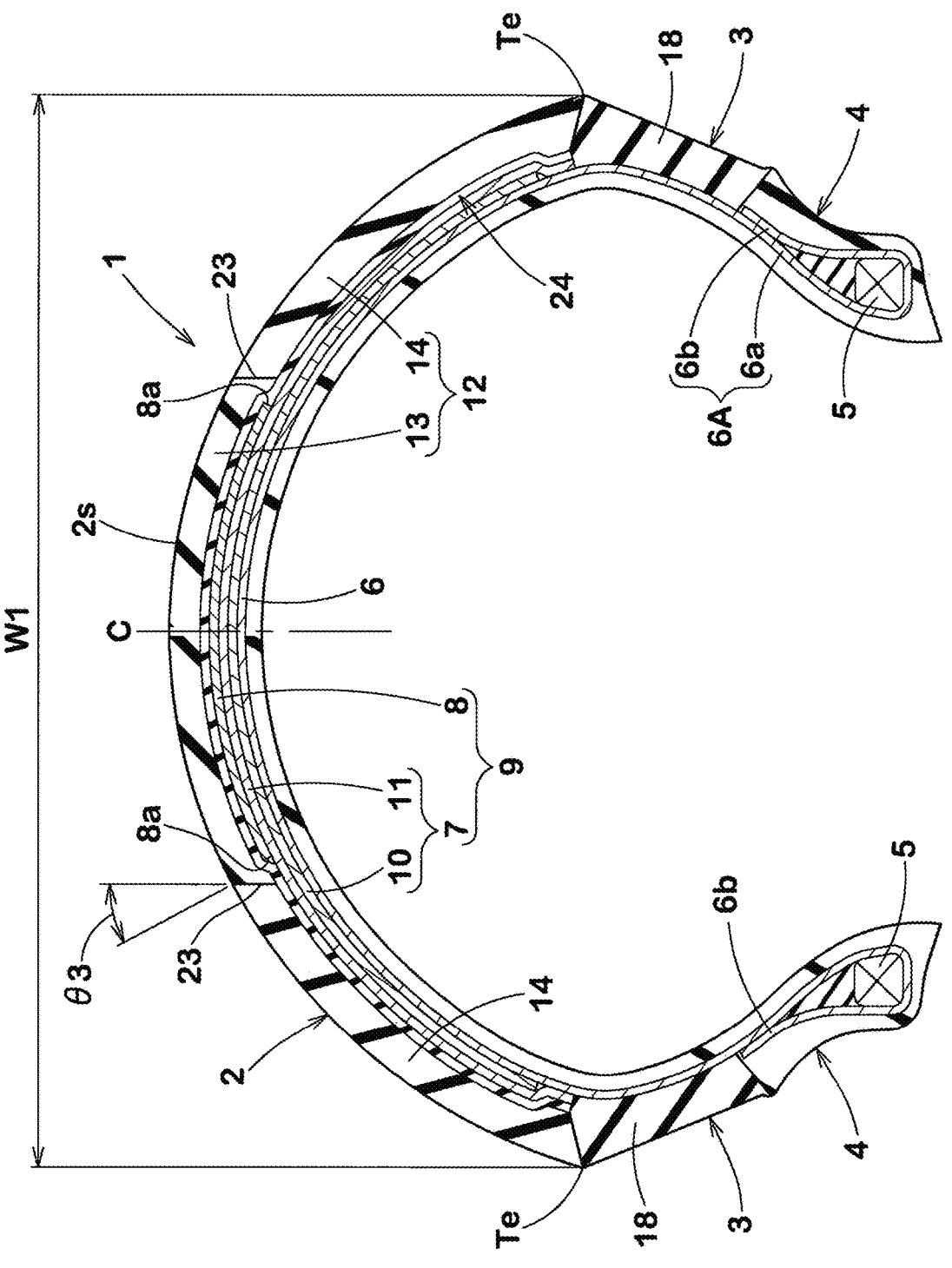
FIG. 1 is a cross-sectional view showing a motorcycle tire of one or more embodiments of the present disclosure.

Hereinafter, one or more embodiments of the present disclosure will be described with reference to the drawings. FIG. 1 is a tire meridian cross-sectional view, of a motorcycle tire 1 (hereinafter simply referred to as "tire") according to one or more embodiments of the present disclosure, including a tire rotation axis in a standardized state. The tire 1 can be a tire for the front wheel of a motorcycle, which can be suitable for on-road sports driving. However, the tire 1 according to one or more embodiments of the present disclosure is not limited to such a mode.

One or more embodiments of the present disclosure have been made in view of the aforementioned circumstances, and an object of one or more embodiments of the present disclosure, among one or more objects, can be to provide a motorcycle tire that can improve stability during braking and cornering performance.

As a result of adopting configurations according to one or more embodiments of the present disclosure, the motorcycle tire can improve stability during braking and cornering performance.

In the case of a pneumatic tire for which various standards are defined, the term "standardized state" can be regarded as a state where the tire is fitted on a standardized rim and inflated to a standardized internal pressure and no load is applied to the tire. In the case of a tire for which various standards are not defined, the standardized state can mean a standard use state, corresponding to the purpose of use of the tire, where the tire is not mounted on a vehicle and no load is applied to the tire. In the present specification, unless otherwise specified, dimensions and the like of components of the tire are values measured in the standardized state. In addition, dimensions of components (e.g., inner members of the tire 1) that cannot be measured in the standardized state can be values measured in a state where the tire 1 is made to approximate the standardized state as much as possible.

The term "standardized rim" can be regarded as a rim that is defined, in a standard system including a standard on which the tire is based, by the standard for each tire, and can be, for example, the "standard rim" in the JATMA standard, the "Design Rim" in the TRA standard, or the "Measuring Rim" in the ETRTO standard, as examples.

The term "standardized internal pressure" can be regarded as an air pressure that is defined, in a standard system including a standard on which the tire is based, by the standard for each tire, and can be the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard, as examples.

As shown in FIG. 1, the tire 1 of one or more embodiments of the present disclosure can include a tread portion 2, a pair of sidewall portions 3, and a pair of bead portions 4. The sidewall portions 3 can be connected to both sides in the tire axial direction of the tread portion 2. Each bead portion 4 can be connected to the inner side in the tire radial direction of the sidewall portion 3. In the tread portion 2, a ground-contact surface 2s between one tread edge Te and another tread edge Te can be curved in an arc shape that is convex outward in the tire radial direction, for instance, such that a sufficient ground-contact area can be obtained even during cornering in which a camber angle is relatively large. A bead core 5 can be embedded in each bead portion 4.

Each tread edge Te can correspond to an end of the ground-contact surface 2s of the tread portion 2, and can come into contact with a road surface at least upon cornering at a maximum camber angle.

The tire 1 can include a carcass 6 extending on and between the pair of bead portions 4.

The carcass 6 can include, for example, a carcass ply 6A including a plurality of carcass cords. The carcass 6 of one or more embodiments of the present disclosure can be composed of one carcass ply 6A, but may be composed of a plurality of stacked carcass plies. The carcass ply 6A can include a body portion 6a and turned-up portions 6b. The body portion 6a can extend from the tread portion 2 through the sidewall portions 3 on both sides to the bead cores 5 in the bead portions 4 on both sides. Each turned-up portion 6b can be connected to the body portion 6a and turned up from the inner side to the outer side in the tire axial direction around the bead core 5.

Figure 2:
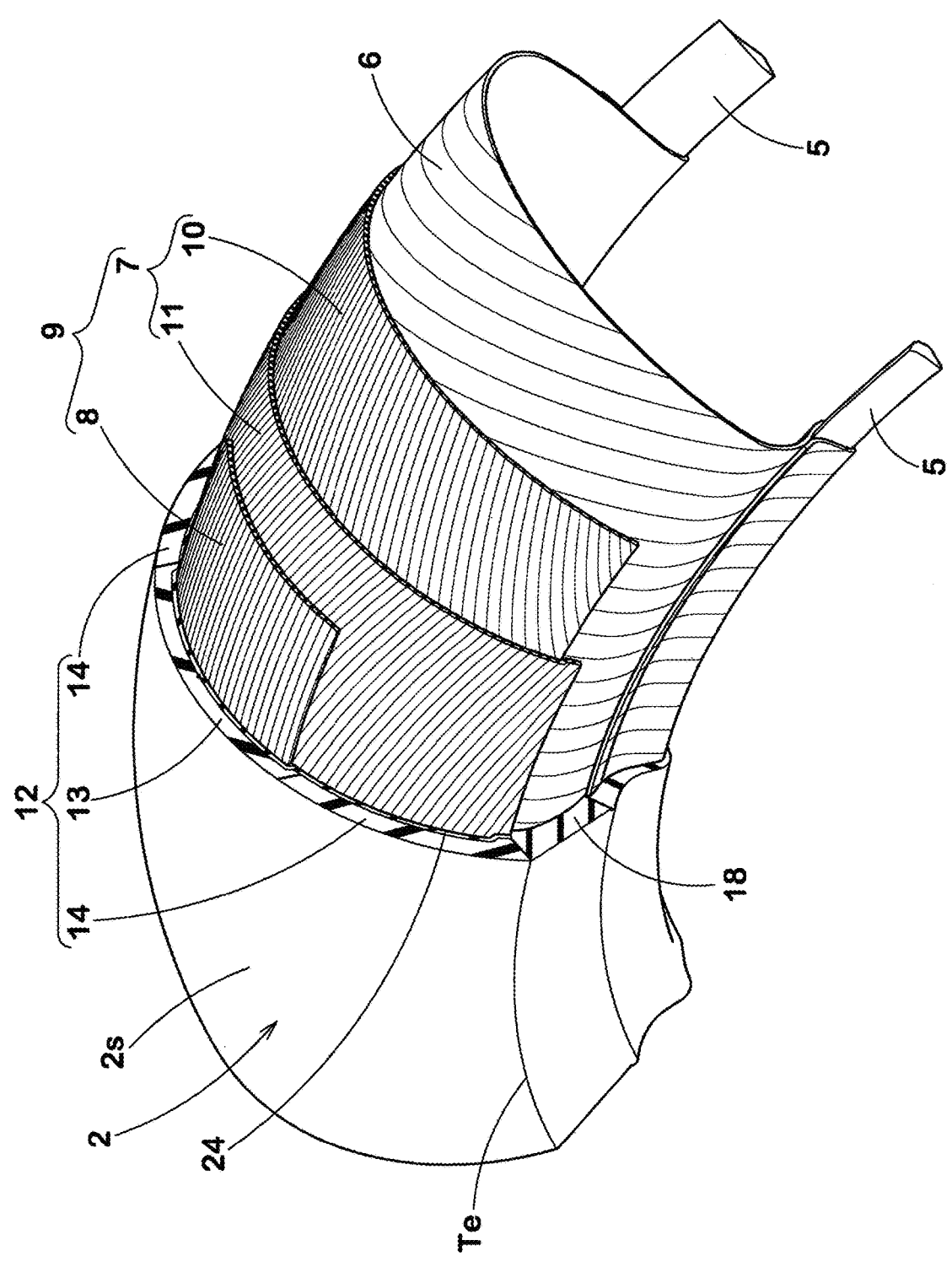
FIG. 2 is an enlarged perspective view showing inner members of the tire in FIG. 1.
Figure 3:
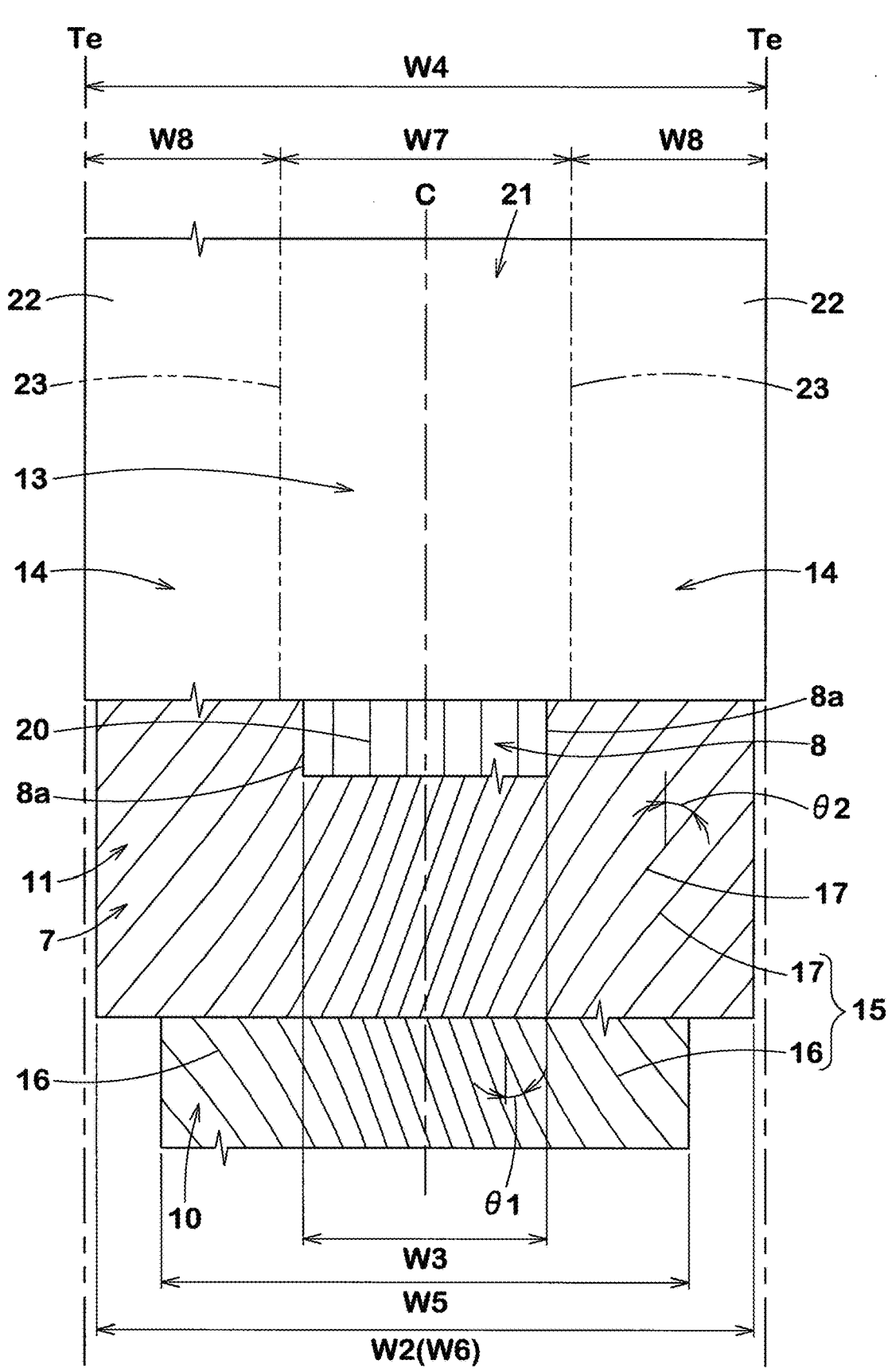
FIG. 3 is a development view of a tread rubber and a tread reinforcing layer in FIG. 1.

The tread portion 2 can include a tread reinforcing layer 9 placed outward of the carcass 6 in the tire radial direction, and a tread rubber 12 placed outward of the tread reinforcing layer 9 in the tire radial direction. The tread reinforcing layer 9 can include a belt layer 7 and a band layer 8 placed outward of the belt layer 7 in the tire radial direction. FIG. 2 shows an enlarged perspective view schematically showing inner members of the tire 1, and FIG. 3 shows a development view of the tread rubber 12 and the tread reinforcing layer 9 developed on a flat surface, each according to one or more embodiments of the present disclosure.

As shown in FIG. 2, for instance, the belt layer 7 can be adjacent to the outer side in the tire radial direction of the carcass 6. In addition, the belt layer 7 can be placed so as to reinforce substantially the entirety of the tread portion 2. Moreover, as shown in FIG. 3, for instance, the belt layer 7 can include a plurality of belt cords 15 inclined with respect to the tire circumferential direction. The angle of these belt cords 15 with respect to the tire circumferential direction can be, for example, 10 to 40°. The belt layer 7 of one or more embodiments of the present disclosure can include a first belt ply 10 adjacent to the carcass 6, and a second belt ply 11 outward of the first belt ply 10 in the tire radial direction. According to one or more embodiments, the belt layer 7 can be composed of only these two belt plies 10, 11. That is, the belt layer 7 can consist of the first belt ply 10 and the second belt ply 11.

The band layer 8 can be at a center portion in the tire axial direction of the tread portion 2, and can be straddle at least a tire equator C. The band layer 8 can include at least one band cord 20 helically wound in the tire circumferential direction. The band layer 8 may include a plurality of wound band cords 20. Alternatively, the band layer 8 may be composed of a band cord 20 covered with a topping rubber, or may be composed of a band cord 20 not covered with a rubber and wound on a rubber sheet. The band layer 8 according to one or more embodiments of the present disclosure composed of, for example, a jointless band in which four band cords 20 covered with a topping rubber are helically wound. According to one or more embodiments of the present disclosure, a development width W3 of the band layer 8 can be smaller than a development width W2 of the belt layer 7. In the present embodiment, a development width W6 of the second belt ply 11 can correspond to the development width W2 of the belt layer 7. The above development width can mean or be regarded as a length in the tire axial direction when the band layer 8 or the belt layer 7 is developed on a flat surface. The same can apply to the following description of the present specification.

As shown in FIG. 1, for instance, the tread rubber 12 can include a crown rubber 13 and shoulder rubbers 14. The crown rubber 13 can be in a region including the tire equator C. Each shoulder rubber 14 can be outward of the crown rubber 13 in the tire axial direction in a region including the tread edge Te. According to one or more embodiments, the shoulder rubber 14 can be connected to the crown rubber 13. In addition, the shoulder rubber 14 can be connected to a sidewall rubber 18.

In general, the temperature of the tread rubber 12 may fluctuate during running due to various factors such as a running speed, a load on the tire 1, and a road surface temperature. For example, if the running speed is high, if the load on the tire 1 is large, or if the road surface temperature is high, the temperature of the tread rubber 12 may rise to about 100° C., for instance.

In view of such a situation, the tire 1 according to one or more embodiments of the present disclosure can have the following relationship between a hardness H, a complex elastic modulus E*, and a 300% modulus M300 of rubber at 100° C. for the crown rubber 13 and each shoulder rubber 14. A hardness Hs at 100° C. of the shoulder rubber 14 can be higher than a hardness Hc at 100° C. of the crown rubber 13. A complex elastic modulus E*s at 100° C. of the shoulder rubber 14 can be higher than a complex elastic modulus E*c at 100° C. of the crown rubber 13. A 300% modulus M300s at 100° C. of the shoulder rubber 14 can be higher than a 300% modulus M300c at 100° C. of the crown rubber 13.

The hardness H of rubber can be a value measured with a type A durometer in accordance with JIS-K6253, for instance.

The complex elastic modulus E* can be a value measured under the conditions shown below, for instance, in accordance with JIS-K6394 using a viscoelasticity spectrometer such as "EPLEXOR (registered trademark)" manufactured by NETZSCH-Gerätebau GmbH.

Initial strain: 10%
Amplitude: ±2.5%
Frequency: 10 Hz
Deformation mode: tensile

The 300% modulus M300 can be a modulus at 300% elongation, and can be a value measured in accordance with JIS-K6251 "Rubber, vulcanized or thermoplastic-Determination of tensile stress-strain properties," for instance.

As a result of adopting the above-described configuration, the tire 1 according to one or more embodiments of the present disclosure can improve stability during braking and cornering performance. A reason for this can be as follows.

According to one or more embodiments of the present disclosure, the above-described band layer 8 can increase the stiffness in the tire circumferential direction of the tread portion 2. Accordingly, radially outward growth of the region in which the crown rubber 13 is placed can be effectively suppressed. Therefore, during straight running in which the tread rubber 12 (in this example, the crown rubber 13) in the region in which the band layer 8 is placed comes into contact with the ground, the band layer 8 can improve stability during braking. Meanwhile, according to one or more embodiments of the present disclosure, in the region outside of the band layer 8 in the tire axial direction, the belt layer 7 can increase the stiffness in the tire axial direction of the tread portion 2. Accordingly, during cornering in which the tread rubber 12 (in this example, the shoulder rubber 14) in the region in which the band layer 8 is not placed comes into contact with the ground, the belt layer 7 can provide a relatively large cornering force, for instance, so that excellent cornering performance can be achieved.

Furthermore, the present inventor has found that by making the stiffness of each shoulder rubber 14 higher than the stiffness of the crown rubber 13, stability during braking and cornering performance can be improved. That is, by making the stiffnesses of the respective rubbers different from each other as described above, the crown rubber 13 can exhibit a high vibration absorption effect during braking to improve stability during braking. In addition, during cornering, the shoulder rubber 14 which forms a ground-contact surface can provide a large reaction force to improve cornering performance.

In general, the stiffness of rubber can be specified by the complex elastic modulus E*. Meanwhile, as a result of various experiments, it has been found that as for the stiffnesses of each shoulder rubber 14 and the crown rubber 13, the above-described effects may not be sufficiently obtained in a running state where the amount of deformation of the tread rubber 12 is small (e.g. low-speed running on general roads) or a in a running state where the amount of deformation of the tread rubber 12 is large (e.g., limit running on circuits, etc.) by merely specifying the complex elastic modulus E*.

According to one or more embodiments of the present disclosure, not only the complex elastic modulus E* but also the hardness Hc at 100° C. of the crown rubber 13 which forms the ground-contact surface 2s during straight running can be specified, for instance, so that sufficient stability during braking can be achieved even in a running state where the amount of deformation of the tread rubber 12 is relatively small. Also, according to one or more embodiments of the present disclosure, the 300% modulus M300 at 100° C. can be specified, for instance, so that sufficient cornering performance can be achieved even in a running state where the amount of deformation of the tread rubber 12 which forms the ground-contact surface 2s is large due to heat generated by friction with a road surface during cornering. Thus, the tire 1 according to one or more embodiments of the present disclosure can improve stability during braking and cornering performance in various situations.

Hereinafter, more detailed configurations of one or more embodiments of the present disclosure will be described. Each configuration described below may be regarded as showing a specific mode according to one or more embodiments of the present disclosure. Therefore, it is needless to say that one or more embodiments of the present disclosure can achieve the above-described effect even when the specific configurations described below are not provided. In addition, even when any one of the configurations described below is independently applied to the tire according to one or more embodiments of the present disclosure having the above-described characteristics, performance improvement corresponding to each configuration can be expected. Furthermore, when some of the configurations described below are applied in combination, complex performance improvement corresponding to each configuration can be expected.

[Details of Belt Layer]

As shown in FIG. 3, for instance, each of a development width W5 of the first belt ply 10 and the development width W6 of the second belt ply 11 is 80% to 100%, for instance, 90% to 95% of a development width W4 of the tread portion 2 (shown in FIG. 1). In addition, the development width W6 of the second belt ply 11 can be larger than the development width W5 of the first belt ply 10. Accordingly, damage starting from the vicinity of each end portion of the first belt ply 10 can be suppressed, and the durability of the region in which each shoulder rubber 14 (shown in FIG. 1) is placed can be improved. The development width W4 of the tread portion 2 can correspond to the distance in the tire axial direction from one tread edge Te to the other tread edge Te when the ground-contact surface 2s of the tread portion 2 is developed on a flat surface.

As shown in FIG. 3, for instance, the first belt ply 10 according to one or more embodiments of the present disclosure can include a plurality of first belt cords 16 inclined in a first direction (downward toward the right side in FIG. 3) with respect to the tire circumferential direction. The second belt ply 11 can include a plurality of second belt cords 17 inclined in a second direction opposite to the first direction (upward toward the right side in FIG. 3) with respect to the tire circumferential direction. Owing to such arrangement of the belt cords, the tread portion 2 can be firmly reinforced, and excellent cornering performance can be exhibited.

The average of angles $\theta 1$ of the first belt cords 16 with respect to the tire circumferential direction can be 10 to 40°, as an example range. The average of the angles $\theta 1$ can correspond to a value obtained by dividing the sum of angles, with respect to the tire circumferential direction, of multiple micro regions into which the first belt cords 16 is divided and which have the same length, by the number of the micro regions. The same can apply to the following description of the present specification. The length of each micro region can be not greater than 5 mm, for instance. According to one or more embodiments of the present disclosure, by setting the first belt cords 16 at the above-described angle, straight running stability and cornering performance can be improved in a well-balanced manner.

The maximum angle of the first belt cords 16 with respect to the tire circumferential direction at each end portion in the tire axial direction of the first belt ply 10 can be larger than the maximum angle of the first belt cords 16 with respect to the tire circumferential direction on the tire equator C. According to one or more embodiments, the average of the angles of the plurality of first belt cords 16 with respect to the tire circumferential direction in the region in which each shoulder rubber 14 is placed can be larger than the average of the angles of the plurality of first belt cords 16 with respect to the tire circumferential direction in the region in which the crown rubber 13 is placed. Owing to such arrangement of the first belt cords 16, the stiffness in the tire circumferential direction can be improved in the region in which the crown rubber 13 is placed, and the stiffness in the tire axial direction can be improved in the region in which each shoulder rubber 14 is placed. Therefore, straight running stability and cornering performance can be improved in a well-balanced manner.

The average of angles $\theta 2$ of the second belt cords 17 with respect to the tire circumferential direction can be 10 to 40°, as an example range. In addition, the maximum angle of the second belt cords 17 with respect to the tire circumferential direction at each end portion in the tire axial direction of the second belt ply 11 can be larger than the maximum angle of the second belt cords 17 with respect to the tire circumferential direction on the tire equator C. According to one or more embodiments, the average of the angles of the plurality of second belt cords 17 with respect to the tire circumferential direction in the region in which each shoulder rubber 14 is placed can be larger than the average of the angles of the plurality of second belt cords 17 with respect to the tire circumferential direction in the region in which the crown rubber 13 is placed. Owing to such arrangement of the second belt cords 17, straight running stability and cornering performance can be improved in a well-balanced manner.

The materials of the first belt cords 16 and the second belt cords 17 may not be particularly limited, and, for example, organic fibers such as polyester fibers, nylon fibers, or aramid fibers can be employed.

The first belt cords 16 and the second belt cords 17 according to one or more embodiments of the present disclosure can each be formed of a non-twisted single cord. Such belt cords may be less likely to be stretched than twisted cords. Therefore, it may be relatively easy to generate a large reaction force linearly during cornering, for instance, so that steering stability can be improved.

[Details of Band Layer]

The development width W3 of the band layer 8 can be, for example, 20% to 80% of the development width W4 of the tread portion 2. In addition, the development width W3 of the band layer 8 can be 20% to 60% of the development width W2 of the belt layer 7. Meanwhile, from the viewpoint of exerting a relatively large cornering force even at a relatively small camber angle, the development width W3 of the band layer 8 can be relatively small. From such a viewpoint, the development width W3 of the band layer 8 can be 20% to 50%, for instance, 20% to 40% of the development width W2 of the belt layer 7.

The breaking strength (which is the maximum stress at break) of the band cord 20 can be higher than the breaking strength of each belt cord 15. From such a viewpoint, the band cord 20 can be a steel cord. Accordingly, even when the development width W3 of the band layer 8 is small, straight running stability can be reliably improved.

[Details of Crown Rubber]

A development width W7 of a ground-contact surface 21 of the crown rubber 13 can be, for example, 80 to 120% of the development width W3 of the band layer 8. When the development width W7 of the ground-contact surface 21 of the crown rubber 13 is not less than 80% of the development width W3 of the band layer 8, during straight running, the band layer 8 can improve stability upon braking, and the crown rubber 13 which forms the ground-contact surface 2s can exhibit a high vibration absorption effect, for instance, so that stability during braking can be more effectively improved. When the development width W7 of the ground-contact surface 21 of the crown rubber 13 is not greater than 120% of the development width W3 of the band layer 8, the rubber volume of each shoulder rubber 14 can be sufficiently ensured, for instance, so that cornering performance can be further improved.

From the viewpoint of further effectively improving stability during braking, the development width W7 of the ground-contact surface 21 of the crown rubber 13 can be larger than the development width W3 of the band layer 8. When the development width W7 is larger than the development width W3, the ground-contact surface 2s can be composed of only the ground-contact surface 21 of the crown rubber 13 during straight running. That is, the ground-contact surface 2s can be formed by one rubber. Therefore, for example, as in the case where the ground-contact surface 2s is formed by two types of rubbers such as the crown rubber 13 and the shoulder rubber 14, the boundary between the rubbers (in this example, a boundary 23 between the crown rubber 13 and the shoulder rubber 14 described later) may not be located at the ground-contact surface 2s, for instance, so that strain is less likely to occur at the ground-contact surface 2s during braking, which can improve stability during braking.

From the viewpoint of adjusting the stiffness in the tire circumferential direction of the crown rubber 13 to be in an appropriate range, the hardness Hc at 100° C. of the crown rubber 13 can be not less than 38 degrees and more preferably not less than 39 degrees, for instance, not greater than 42 degrees or not greater than 41 degrees. The crown rubber 13 having such a hardness Hc can be deformed moderately at 100° C., and the stiffness thereof can be adjusted in an appropriate range, for instance, so that a braking force can be effectively exerted and a relatively high vibration absorption effect can be exhibited.

From the same viewpoint, the complex elastic modulus E*c at 100° C. of the crown rubber 13 can be not less than 2.1 MPa, such as not less than 2.3 MPa, and can be not greater than 2.7 MPa, for instance, not greater than 2.5 MPa. The crown rubber 13 having such a complex elastic modulus E*c can have appropriate elasticity at 100° C., and the stiffness thereof can be adjusted in an appropriate range, for instance, so that the same effects as those described above can be exhibited.

From the same viewpoint, the 300% modulus M300c at 100° C. of the crown rubber 13 can be not less than 4.0 MPa, for instance, ¥ not less than 4.2 MPa, and can be not greater than 4.8 MPa, for instance, not greater than 4.6 MPa. The crown rubber 13 having such a 300% modulus M300c can have appropriate flexibility at 100° C., and the stiffness thereof can be adjusted in an appropriate range, for instance, so that the same effects as those described above can be exhibited.

As described above, in general, the temperature of the tread rubber 12 can fluctuate during running due to a running speed, a load on the tire 1, a road surface temperature, etc. For example, if the running speed is low, if the load on the tire 1 is small, or if the road surface temperature is low, the temperature of the tread rubber 12 may indicate about 50° C. Therefore, performance at 50° C. can be specified for each component of the tread rubber 12.

From the viewpoint of the above, a hardness Hc at 50° C. of the crown rubber 13 can be not less than 44 degrees, such as not less than 45 degrees, and can be not greater than 48 degrees, for instance, not greater than 47 degrees. The stiffness of the crown rubber 13 having such a hardness Hc can be adjusted in an appropriate range even at 50° C., for instance, so that a braking force can be effectively exerted and a high vibration absorption effect can be exhibited.

From the same viewpoint, a complex elastic modulus E*c at 50° C. of the crown rubber 13 can be not less than 3.2 MPa, for instance, not less than 3.4 MPa, and can be not greater than 3.8 MPa, for instance, not greater than 3.6 MPa. Accordingly, the crown rubber 13 can have appropriate elasticity at 50° C., and the stiffness thereof can be adjusted in an appropriate range, for instance, so that the above-described effects can be expected.

[Details of Shoulder Rubber]

As shown in FIG. 3, for instance, a development width W8 of a ground-contact surface 22 of each shoulder rubber 14 can be 60 to 90% of the development width W7 of the crown rubber 13, as an example. Accordingly, stability during braking and cornering performance can be improved in a well-balanced manner.

From the viewpoint of adjusting the stiffness in the tire axial direction of each shoulder rubber 14 at 100° C. to be in an appropriate range, the hardness Hs at 100° C. of the shoulder rubber 14 can be not less than 40 degrees, for instance, not less than 41 degrees, and can be not greater than 44 degrees, for instance, not greater than 43 degrees.

Accordingly, the above-described effects can be exhibited, and controllability during cornering can also be improved.

From the same viewpoint, the complex elastic modulus E*s at 100° C. of the shoulder rubber 14 can be not less than 2.4 MPa, for instance, not less than 2.6 MPa, and can be not greater than 3.0 MPa, for instance, not greater than 2.8 MPa. In addition, the 300% modulus M300*s* at 100° C. of the shoulder rubber 14 can be not less than 4.7 MPa, for instance, not less than 4.9 MPa, and can be not greater than 5.5 MPa, for instance, not greater than 5.3 MPa. Accordingly, the stiffness of the shoulder rubber 14 can be adjusted in an appropriate range, for instance, so that the above-described effects can be reliably exhibited.

From the viewpoint of adjusting the stiffness in the tire axial direction of each shoulder rubber 14 at 50° C. to be in an appropriate range as described above, a hardness Hs at 50° C. of the shoulder rubber 14 can be not less than 47 degrees, for instance, not less than 48 degrees, and can be not greater than 51 degrees, for instance, not greater than 50 degrees. Such a shoulder rubber 14 can be deformed moderately when the temperature of the shoulder rubber 14 is about 50° C. which can be regarded as a relatively low temperature, and the stiffness thereof can be adjusted in an appropriate range, for instance, so that the same effects as those described above can be exhibited.

From the same viewpoint, a complex elastic modulus E*s at 50° C. of the shoulder rubber 14 can be not less than 4.0 MPa, for instance, not less than 4.2 MPa, and can be not greater than 4.6 MPa, for instance, not greater than 4.4 MPa. Such a shoulder rubber 14 can have appropriate elasticity when the temperature of the shoulder rubber 14 is about 50° C. which can be regarded as a relatively low temperature, and the stiffness thereof can be adjusted in an appropriate range, for instance, so that the same effects as those described above can be exhibited.

[Relationship Between Crown Rubber and Shoulder Rubber]

From the viewpoint of adjusting the stiffnesses of the crown rubber 13 and each shoulder rubber 14 to be in an appropriate range when the load on the tire 1 is relatively low as described above, a hardness H, a complex elastic modulus E*, and a 300% modulus M300 of rubber at 50° C. can have the following relationship. The hardness Hs at 50° C. of the shoulder rubber 14 can be higher than the hardness Hc at 50° C. of the crown rubber 13. The complex elastic modulus E*s at 50° C. of the shoulder rubber 14 can be higher than the complex elastic modulus E*c at 50° C. of the crown rubber 13. A 300% modulus M300*s* at 50° C. of the shoulder rubber 14 can be higher than a 300% modulus M300*c* at 50° C. of the crown rubber 13. Such a tire 1 can improve stability during braking and cornering performance not only at about 100° C. which can be regarded as a relatively high temperature during running but also at about 50° C. which can be regarded as a relatively low temperature during running. Therefore, such a tire 1 can exhibit the above-described effects in accordance with the change in the running speed, the load on the tire 1, the road surface temperature, etc.

From the viewpoint of adjusting the stiffnesses of the crown rubber 13 and each shoulder rubber 14 at 100° C. to be in an appropriate range, the hardness Hs at 100° C. of the shoulder rubber 14 can be not less than 105%, for instance, not less than 110% of the hardness Hc at 100° C. of the crown rubber 13, and can be not greater than 125%, for instance, not greater than 120% of the hardness Hc at 100° C. of the crown rubber 13. The stiffnesses of such crown rubber 13 and shoulder rubber 14 can be appropriately balanced, for instance, so that stability during braking and cornering performance can be improved in a well-balanced manner.

From the same viewpoint, the complex elastic modulus E*s at 100° C. of the shoulder rubber 14 can be not less than 105%, for instance, not less than 110% of the complex elastic modulus E*c at 100° C. of the crown rubber 13, and can be not greater than 150%, for instance, not greater than 140% of the complex elastic modulus E*c at 100° C. of the crown rubber 13. The stiffnesses of such crown rubber 13 and shoulder rubber 14 can be appropriately balanced, for instance, so that stability during braking and cornering performance can be improved in a well-balanced manner.

From the same viewpoint, the 300% modulus M300*s* at 100° C. of the shoulder rubber 14 can be not less than 105%, for instance, not less than 110% of the 300% modulus M300*c* at 100° C. of the crown rubber 13, and can be not greater than 150%, for instance, not greater than 140% of the 300% modulus M300*c* at 100° C. of the crown rubber 13. The stiffnesses of such crown rubber 13 and shoulder rubber 14 can be appropriately balanced, for instance, so that stability during braking and cornering performance can be improved in a well-balanced manner.

From the viewpoint of adjusting the stiffnesses of the crown rubber 13 and each shoulder rubber 14 at 50° C. to be in an appropriate range, the hardness Hs at 50° C. of the shoulder rubber 14 can be not less than 105%, for instance, not less than 110% of the hardness Hc at 50° C. of the crown rubber 13, and can be not greater than 125%, for instance, not greater than 120% of the hardness Hc at 50° C. of the crown rubber 13. The stiffnesses of such crown rubber 13 and shoulder rubber 14 can be appropriately balanced, for instance, so that stability during braking and cornering performance can be improved in a well-balanced manner.

From the same viewpoint, the complex elastic modulus E*s at 50° C. of the shoulder rubber 14 can be not less than 105%, for instance, not less than 110% of the complex elastic modulus E*c at 50° C. of the crown rubber 13, and can be not greater than 150%, for instance, not greater than 140% of the complex elastic modulus E*c at 50° C. of the crown rubber 13. The stiffnesses of such crown rubber 13 and shoulder rubber 14 can be appropriately balanced, for instance, so that stability during braking and cornering performance can be improved in a well-balanced manner.

From the same viewpoint, the 300% modulus M300*s* at 50° C. of the shoulder rubber 14 can be not less than 105%, for instance, not less than 110% of the 300% modulus M300*c* at 50° C. of the crown rubber 13, and can be not greater than 150%, for instance, not greater than 140% of the 300% modulus M300*c* at 50° C. of the crown rubber 13. The stiffnesses of such crown rubber 13 and shoulder rubber 14 can be appropriately balanced, for instance, so that stability during braking and cornering performance can be improved in a well-balanced manner.

In general, a rubber having a relatively large loss tangent tan δ can be regarded as having excellent heat generation properties and can provide a large grip force. Based on such a technical matter, a loss tangent tan δs at 100° C. of each shoulder rubber 14 can be higher than a loss tangent tan δc at 100° C. of the crown rubber 13. Such a shoulder rubber 14 can provide a relatively large grip force even when the temperature of the shoulder rubber 14 rises to about 100° C., for instance, due to friction with a road surface during cornering, so that steering stability can be maintained. In addition, heat generation of such a crown rubber 13 can be suppressed (e.g., moderately), for instance, so that stability during high speed running can be maintained high.

The loss tangent tan δ can be regarded as a value measured under the conditions shown below, for instance, in accordance with the standards of JIS-K6394 using the above-described viscoelasticity spectrometer.

Initial strain: 5%

Amplitude: ±1%

Frequency: 10 Hz

Deformation mode: stretch

A loss tangent tan δs at 50° C. of each shoulder rubber 14 can be higher than a loss tangent tan δc at 50° C. of the crown rubber 13. Such a shoulder rubber 14 can provide a relatively large grip force even when the temperature of the shoulder rubber 14 rises only to about 50° C., for instance, due to friction with a road surface, etc., during cornering, so that steering stability can be maintained. In addition, heat generation of such a crown rubber 13 can be suppressed (e.g., moderately), for instance, so that stability during high speed running can be maintained high.

The characteristics of each rubber described above can be obtained by combining rubber materials and production methods as appropriate.

From the viewpoint of making the stiffness of each shoulder rubber 14 higher than the stiffness of the crown rubber 13, the amount of carbon added to the crown rubber 13 can be smaller than the amount of carbon added to the shoulder rubber 14. Such a tire 1 can improve stability during braking and cornering performance.

[Details of Boundary]

As shown in FIG. 1, the crown rubber 13 of one or more embodiments of the present disclosure can extend with a substantially constant thickness in the region outside of the band layer 8 in the tire radial direction. In addition, each shoulder rubber 14 of one or more embodiments of the present disclosure can extend with a substantially constant thickness on the outer side of the first belt ply 10 in the tire radial direction. Each of the tread rubber 12, the crown rubber 13, and the shoulder rubbers 14 may not be limited to such a mode, and, for example, each shoulder rubber 14 may extend such that the thickness thereof decreases with decreasing distance to the tread edge Te. Extending with a substantially constant thickness can allow for unavoidable errors in rubber products such as a tire, and can include a mode in which the difference between the maximum and minimum values of the thickness of a rubber layer is not greater than 5% of the maximum value.

According to one or more embodiments of the present disclosure, in a tire meridian cross-section, the boundary 23 between the crown rubber 13 and the shoulder rubber 14 can have a linear shape along the tire radial direction. In addition, the boundary 23 can extend in the tire circumferential direction while maintaining this shape. The boundary 23 can be inclined with respect to a tire normal line orthogonal to the ground-contact surface 2s. An angle θ3 of the boundary 23 with respect to the tire normal line can be 20 to 70°, for instance, 20 to 40°. When the angle θ3 is 20 to 70°, a relatively large cross-sectional length of the boundary 23 can be ensured, for instance, so that separation between the crown rubber 13 and the shoulder rubber 14 can be suppressed. When the angle θ3 is 20 to 40°, during straight running, the ground-contact surface 2s can be composed of only the ground-contact surface 21 of the crown rubber 13, and the boundary 23 may not be located at the ground-contact surface 2s. Accordingly, strain may be less likely to occur at the ground-contact surface 2s during braking, which can improve stability during braking. The boundary 23 may not be limited to such a mode, and may have a curved shape, for example.

The boundary 23 between the crown rubber 13 and the shoulder rubber 14 can be formed on each of both sides of the tire equator C. These two boundaries 23 can be arranged so as to be symmetrical with respect to the tire equator C. Such a tire 1 can be regarded as having excellent balance performance between left cornering and right cornering, and can further improve cornering performance.

According to one or more embodiments of the present disclosure, the boundary 23 between the crown rubber 13 and each shoulder rubber 14 can be located on the tread edge Te side with respect to an end 8a in the tire axial direction of the band layer 8. Owing to such arrangement of the boundary 23, the crown rubber 13 can cover the entire band layer 8, for instance, so that stability during braking can be improved.

[Base Rubber]

The tread portion 2 of one or more embodiments of the present disclosure can include a base rubber 24 placed between the tread reinforcing layer 9 and the tread rubber 12. The base rubber 24 can be adjacent to the crown rubber 13 and each shoulder rubber 14.

According to one or more embodiments, a hardness at 100° C. of such a base rubber 24 can be higher than the hardness Hc at 100° C. of the crown rubber 13 and/or lower than the hardness Hs at 100° C. of the shoulder rubber 14. Accordingly, the adhesiveness of the tread rubber 12 can be made uniform, for instance, so that the tread rubber 12 can be inhibited from being peeled from the tread reinforcing layer 9.

From the same viewpoint, a complex elastic modulus at 100° C. of the base rubber 24 can be higher than the complex elastic modulus E*c at 100° C. of the crown rubber 13 and lower than the complex elastic modulus E*s at 100° C. of the shoulder rubber 14. In addition, a 300% modulus at 100° C. of the base rubber 24 can be higher than the 300% modulus M300c at 100° C. of the crown rubber 13 and lower than the 300% modulus M300s at 100° C. of the shoulder rubber 14.

[Radius of Curvature of Profile]

Figure 4:
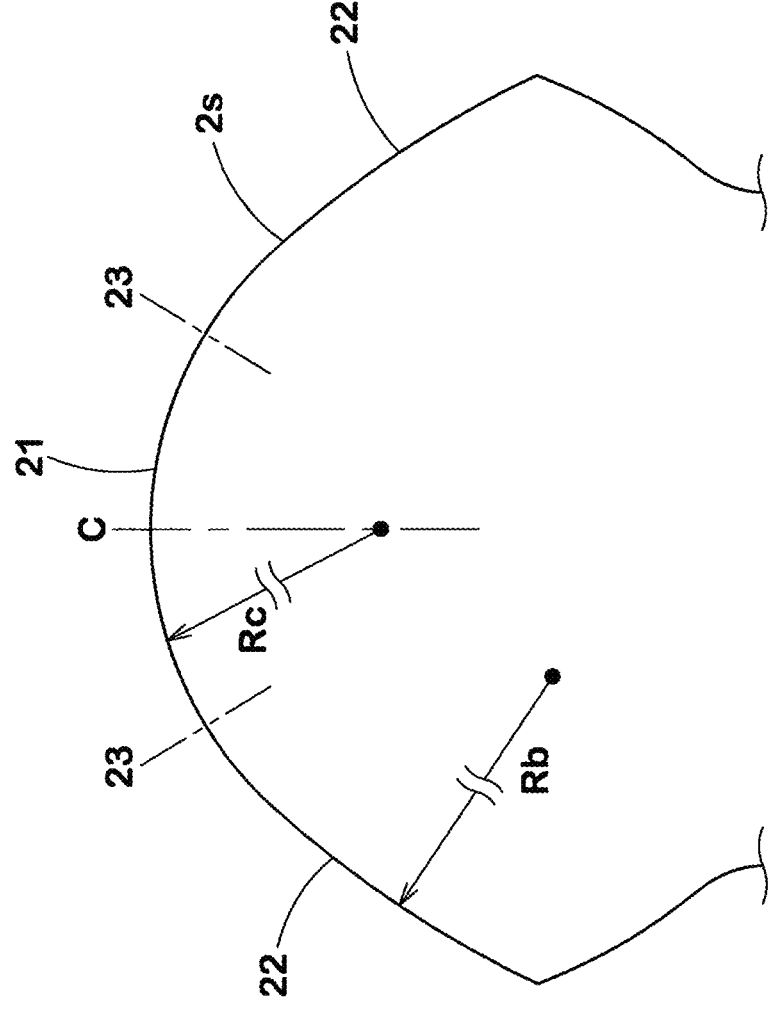
FIG. 4 shows a profile of a tread portion in a 10 kPa state according to one or more embodiments of the present disclosure.

FIG. 4 shows a profile of the tread portion 2 in a tire meridian cross-section in a 10 kPa state where the tire 1 is fitted on the standardized rim and inflated to an internal pressure of 10 kPa, according to one or more embodiments of the present disclosure. As shown in FIG. 4, in the 10 kPa state, a radius of curvature Rc of the ground-contact surface 21 of the crown rubber 13 (shown in FIG. 1) can be less than 95% of a tire cross-sectional width W1 (shown in FIG. 1), and a radius of curvature Rb of the ground-contact surface 22 of each shoulder rubber 14 (shown in FIG. 1) can be larger than the radius of curvature Rc. The tire cross-sectional width W1 can correspond to a width in the tire axial direction in the standardized state.

As described above, the profile of the tread portion 2 can be specified in the 10 kPa state, and the radius of curvature Rc of the ground-contact surface 21 of the crown rubber 13 can be relatively small. Even when such a tire 1 is inflated to the standardized internal pressure and radially outward growth of the region in which each shoulder rubber 14 is placed occurs, the change in the radius of curvature of the ground-contact surface 2s of the tread portion 2 can occur mainly in the region in which the crown rubber 13 is placed, and the change in the radius of curvature Rb of the ground-contact surface 22 of the shoulder rubber 14 may be less likely to occur. Therefore, the radius of curvature Rb of the ground-contact surface 22 of the shoulder rubber 14 can be appropriately maintained without becoming excessively large, for instance, so that cornering performance can be maintained.

Although the motorcycle tire of one or more embodiments of the present disclosure has been described in detail above, one or more embodiments of the present disclosure are not limited to the above specific embodiment, and various modifications can be made.

EXAMPLES

Motorcycle tires (front wheel tires) with a size of 120/70ZR17 having the basic structure shown in FIG. 1 were <Stability During Braking>

Using the above test vehicle, stability during braking was evaluated when full braking was applied in a state of running straight at 220 km/h on an asphalt road surface. The results are indicated as scores with the result of the comparative example as 100. A higher value indicates that the stability during braking is better.

<Cornering Performance>

Cornering performance was evaluated when the above test vehicle ran on a mountain road having an asphalt road surface. The cornering performance was evaluated based on the overall evaluation of turning response in corners, the degree of freedom during cornering, the front wheel turn-in characteristics, etc. The results are indicated as scores with the result of the comparative example as 100. A higher value indicates that these evaluation items are better.

The results of the tests are shown in Table 1.

TABLE 1

| | Comp. Ex. | Ex. 1 | Ex. 2 | Ex. 3 | Ex. 4 | Ex. 5 | Ex. 6 |
|---|---|---|---|---|---|---|---|
| Development width W7 of ground-contact surface of crown rubber/development width W3 of band layer (%) | — | 80 | 120 | 100 | 120 | 100 | 100 |
| Relationship between loss tangent tanδc of crown rubber and loss tangent tanδs of shoulder rubber | — | tanδc > tanδs | | | tanδc < tanδs | | |
| Hardness Hc of crown rubber at 100° C. | 45 | 40 | 40 | 38 | 40 | 40 | 42 |
| Complex elastic modulus E*c of crown rubber at 100° C. | 3.0 | 2.4 | 2.4 | 2.1 | 2.4 | 2.4 | 2.7 |
| 300% modulus M300c of crown rubber at 100° C. | 5.2 | 4.5 | 4.5 | 4.0 | 4.5 | 4.5 | 4.8 |
| Hardness Hs of shoulder rubber at 100° C. | 45 | 42 | 42 | 40 | 42 | 42 | 44 |
| Complex elastic modulus E*s of shoulder rubber at 100° C. | 3.0 | 2.7 | 2.7 | 2.4 | 2.7 | 2.7 | 3.0 |
| 300% modulus M300s of shoulder rubber at 100° C. | 5.2 | 5.0 | 5.0 | 4.7 | 5.0 | 5.0 | 5.5 |
| Stability during braking (score) | 100 | 120 | 120 | 120 | 120 | 140 | 105 |
| Cornering performance (score) | 100 | 120 | 120 | 105 | 140 | 140 | 120 | produced based on specifications in Table 1. As a comparative example, a tire in which only one type of rubber was placed as a tread rubber in a tread portion without any distinction between a crown rubber and a shoulder rubber (in Table 1, the hardnesses, the complex elastic moduli, and the 300% moduli of the crown rubber and the shoulder rubber are the same as each other) was produced as a test tire. The tire of the comparative example has substantially the same configuration as the tire of each Example, except for the matters described above. Each test tire was evaluated for stability during braking and cornering performance. The common specifications and test methods for each test tire are as follows.

Rim size: MT3.50×17
Tire internal pressure: 250 kPa
Test vehicle: engine displacement of 1000 cc
Development width W5 of first belt ply: 140 mm
Development width W6 of second belt ply: 150 mm
Development width W3 of band layer: 60 mm As a result of the test, it is confirmed that the tire of each Example can improve stability during braking and cornering performance.

Additional Note

One or more embodiments of the present disclosure can include the following aspects.

[Present Disclosure 1]

A motorcycle tire including:

a tread portion;

a pair of sidewall portions;

a pair of bead portions; and a carcass extending on and between the pair of bead portions, wherein the tread portion includes a tread reinforcing layer placed outward of the carcass in a tire radial direction, and a tread rubber placed outward of the tread reinforcing layer in the tire radial direction, the tread reinforcing layer includes a belt layer including a plurality of belt cords inclined with respect to a tire circumferential direction, and a band layer placed outward of the belt layer in the tire radial direction and including at least one band cord helically wound in the tire circumferential direction, a development width of the band layer is smaller than a development width of the belt layer, the tread rubber includes a crown rubber placed in a region including a tire equator, and shoulder rubbers each placed outward of the crown rubber in a tire axial direction in a region including a tread edge, a hardness at 100° C. of each shoulder rubber is higher than a hardness at 100° C. of the crown rubber, a complex elastic modulus at 100° C. of each shoulder rubber is higher than a complex elastic modulus at 100° C. of the crown rubber, and a 300% modulus at 100° C. of each shoulder rubber is higher than a 300% modulus at 100° C. of the crown rubber.

[Present Disclosure 2]

The motorcycle tire according to Present Disclosure 1, wherein a loss tangent at 100° C. of each shoulder rubber is higher than a loss tangent at 100° C. of the crown rubber.

[Present Disclosure 3]

The motorcycle tire according to Present Disclosure 1 or 2, wherein a hardness at 50° C. of each shoulder rubber is higher than a hardness at 50° C. of the crown rubber, a complex elastic modulus at 50° C. of each shoulder rubber is higher than a complex elastic modulus at 50° C. of the crown rubber, and a 300% modulus at 50° C. of each shoulder rubber is higher than a 300% modulus at 50° C. of the crown rubber.

[Present Disclosure 4]

The motorcycle tire according to any one of Present Disclosures 1 to 3, wherein a loss tangent at 50° C. of each shoulder rubber is higher than a loss tangent at 50° C. of the crown rubber.

[Present Disclosure 5]

The motorcycle tire according to any one of Present Disclosures 1 to 4, wherein the hardness at 100° C. of the crown rubber is 38 to 42 degrees, the complex elastic modulus at 100° C. of the crown rubber is 2.1 to 2.7 MPa, and the 300% modulus at 100° C. of the crown rubber is 4.0 to 4.8 MPa.

[Present Disclosure 6]

The motorcycle tire according to any one of Present Disclosures 1 to 5, wherein the hardness at 100° C. of each shoulder rubber is 40 to 44 degrees, the complex elastic modulus at 100° C. of each shoulder rubber is 2.4 to 3.0 MPa, and the 300% modulus at 100° C. of each shoulder rubber is 4.7 to 5.5 MPa.

[Present Disclosure 7]

The motorcycle tire according to any one of Present Disclosures 1 to 6, wherein the hardness at 50° C. of the crown rubber is 44 to 48 degrees, and the complex elastic modulus at 50° C. of the crown rubber is 3.2 to 3.8 MPa.

[Present Disclosure 8]

The motorcycle tire according to any one of Present Disclosures 1 to 7, wherein the hardness at 50° C. of each shoulder rubber is 47 to 51 degrees, and the complex elastic modulus at 50° C. of each shoulder rubber is 4.0 to 4.6 MPa.

[Present Disclosure 9]

The motorcycle tire according to any one of Present Disclosures 1 to 8, wherein, in a tire meridian cross-section in a 10 kPa state where the motorcycle tire is fitted on a standardized rim and inflated to an internal pressure of 10 kPa, a radius of curvature Rc of a ground-contact surface of the crown rubber is less than 95% of a tire cross-sectional width, and a radius of curvature Rb of a ground-contact surface of each shoulder rubber is larger than the radius of curvature Rc.

[Present Disclosure 10]

The motorcycle tire according to any one of Present Disclosures 1 to 9, wherein a development width of the ground-contact surface of the crown rubber is 80 to 120% of the development width of the band layer.

[Present Disclosure 11]

The motorcycle tire according to any one of Present Disclosures 1 to 10, wherein a development width of the ground-contact surface of the crown rubber is larger than the development width of the band layer.

[Present Disclosure 12]

The motorcycle tire according to any one of Present Disclosures 1 to 11, wherein the hardness at 100° C. of each shoulder rubber is not less than 105% and not greater than 125% the hardness at 100° C. of the crown rubber, the complex elastic modulus at 100° C. of each shoulder rubber is not less than 105% and not greater than 150% of the complex elastic modulus of the crown rubber, and the 300% modulus at 100° C. of each shoulder rubber is not less than 105% and not greater than 150% the 300% modulus at 100° C. of the crown rubber.

[Present Disclosure 13]

The motorcycle tire according to any one of Present Disclosures 1 to 12, wherein the hardness at 50° C. of each shoulder rubber is not less than 105% and not greater than 125% the hardness at 50° C. of the crown rubber, the complex elastic modulus at 50° C. of each shoulder rubber is not less than 105% and not greater than 150% the complex elastic modulus at 50° C. of the crown rubber, and the 300% modulus at 50° C. of each shoulder rubber is not less than 105% and not greater than 150% the 300% modulus at 50° C. of the crown rubber.

[Present Disclosure 14]

The motorcycle tire any one of Present Disclosures 1 to 13, wherein a breaking strength of the at least one band cord is higher than a breaking strength of each of the plurality of belt cords, the band layer straddles the tire equator and has a width extending in the tire axial direction in a plan view of the tread portion to provide increased stiffness in the tire circumferential direction, the band layer is composed of a jointless band, the belt layer extends in the circumferential direction in the plan view of the tread portion to provide increased stiffness in the tire axial direction, and the belt layer consists of a first ply and a second ply.

[Present Disclosure 15]

The motorcycle tire according to any one of Present Disclosures 1 to 14, wherein the development width the band layer is 20% to 60% of the development width of the belt layer.

[Present Disclosure 16]

The motorcycle tire according to any one of Present Disclosures 1 to 15, wherein a development width a ground-contact surface of each shoulder rubber is 60 to 90% of a development width of the crown rubber, and the development width of the band layer is 20% to 80% of a development width the tread portion.

[Present Disclosure 17]

The motorcycle tire according to any one of Present Disclosures 1 to 16, wherein the belt layer includes a first ply and a second ply, a development width of the first belt ply and a development width of the second belt ply is 80% to 100% a development width of the tread portion, the first ply includes a first plurality of belt cords inclined in a first direction with respect to the tire circumferential direction, and the second ply includes a second plurality of belt cords inclined in a second direction opposite to the first direction with respect to the tire circumferential direction.

[Present Disclosure 18]

The motorcycle tire according to any one of Present Disclosures 1 to 17, wherein each of the belt cords of the first plurality and/or each of the belt cords of the second plurality are formed of a non-twisted single cord.

[Present Disclosure 19]

A motorcycle tire comprising:

a tread portion;

a pair of sidewall portions;

a pair of bead portions; and a carcass extending on and between the pair of bead portions, wherein the tread portion includes a tread reinforcing layer placed outward of the carcass in a tire radial direction, and a tread rubber placed outward of the tread reinforcing layer in the tire radial direction, the tread reinforcing layer includes a belt layer including a plurality of belt cords inclined with respect to a tire circumferential direction, and a band layer placed outward of the belt layer in the tire radial direction and including at least one band cord helically wound in the tire circumferential direction, a development width of the band layer is smaller than a development width of the belt layer, the tread rubber includes a crown rubber placed in a region including a tire equator, and shoulder rubbers each placed outward of the crown rubber in a tire axial direction in a region including a tread edge, a hardness at 100° C. of each shoulder rubber is higher than a hardness at 100° C. of the crown rubber, a complex elastic modulus at 100° C. of each shoulder rubber is higher than a complex elastic modulus at 100° C. of the crown rubber, a 300% modulus at 100° C. of each shoulder rubber is higher than a 300% modulus at 100° C. of the crown rubber, a hardness at 50° C. of each shoulder rubber is higher than a hardness at 50° C. of the crown rubber, a complex elastic modulus at 50° C. of each shoulder rubber is higher than a complex elastic modulus at 50° C. of the crown rubber, a 300% modulus at 50° C. of each shoulder rubber is higher than a 300% modulus at 50° C. of the crown rubber, the hardness at 100° C. of each shoulder rubber is not less than 105% and not greater than 125% the hardness at 100° C. of the crown rubber, the complex elastic modulus at 100° C. of each shoulder rubber is not less than 105% and not greater than 150% of the complex elastic modulus of the crown rubber, the 300% modulus at 100° C. of each shoulder rubber is not less than 105% and not greater than 150% the 300% modulus at 100° C. of the crown rubber, the hardness at 50° C. of each shoulder rubber is not less than 105% and not greater than 125% the hardness at 50° C. of the crown rubber, the complex elastic modulus at 50° C. of each shoulder rubber is not less than 105% and not greater than 150% the complex elastic modulus at 50° C. of the crown rubber, and the 300% modulus at 50° C. of each shoulder rubber is not less than 105% and not greater than 150% the 300% modulus at 50° C. of the crown rubber.

What is claimed is:

1. A motorcycle tire comprising:

a tread portion;

a pair of sidewall portions;

a pair of bead portions; and a carcass extending on and between the pair of bead portions, wherein the tread portion includes a tread reinforcing layer placed outward of the carcass in a tire radial direction, and a tread rubber placed outward of the tread reinforcing layer in the tire radial direction, the tread reinforcing layer includes a belt layer including a plurality of belt cords inclined with respect to a tire circumferential direction, and a band layer placed outward of the belt layer in the tire radial direction and including at least one band cord helically wound in the tire circumferential direction, a development width of the band layer is smaller than a development width of the belt layer, the tread rubber includes a crown rubber placed in a region including a tire equator, and shoulder rubbers each placed outward of the crown rubber in a tire axial direction in a region including a tread edge, a hardness at 100° C. of each shoulder rubber is higher than a hardness at 100° C. of the crown rubber, a complex elastic modulus at 100° C. of each shoulder rubber is higher than a complex elastic modulus at 100° C. of the crown rubber, a 300% modulus at 100° C. of each shoulder rubber is higher than a 300% modulus at 100° C. of the crown rubber, a breaking strength of the at least one band cord is higher than a breaking strength of each of the plurality of belt cords, the belt layer is comprised of a first ply and a second ply, the band layer straddles the tire equator and has a width extending in the tire axial direction in a plan view of the tread portion to provide increased stiffness in the tire circumferential direction, and the belt layer extends in the circumferential direction in the plan view of the tread portion to provide increased stiffness in the tire axial direction.

2. The motorcycle tire according to claim 1, wherein a loss tangent at 100° C. of each shoulder rubber is higher than a loss tangent at 100° C. of the crown rubber.

3. The motorcycle tire according to claim 1, wherein a hardness at 50° C. of each shoulder rubber is higher than a hardness at 50° C. of the crown rubber, a complex elastic modulus at 50° C. of each shoulder rubber is higher than a complex elastic modulus at 50° C. of the crown rubber, and a 300% modulus at 50° C. of each shoulder rubber is higher than a 300% modulus at 50° C. of the crown rubber.

4. The motorcycle tire according to claim 3, wherein a loss tangent at 50° C. of each shoulder rubber is higher than a loss tangent at 50° C. of the crown rubber.

5. The motorcycle tire according to claim 3, wherein the hardness at 50° C. of the crown rubber is 44 to 48 degrees, and the complex elastic modulus at 50° C. of the crown rubber is 3.2 to 3.8 MPa.

6. The motorcycle tire according to claim 5, wherein the hardness at 50° C. of each shoulder rubber is 47 to 51 degrees, and the complex elastic modulus at 50° C. of each shoulder rubber is 4.0 to 4.6 MPa.

7. The motorcycle tire according to claim 3, wherein the hardness at 50° C. of each shoulder rubber is not less than 105% and not greater than 125% the hardness at 50° C. of the crown rubber, the complex elastic modulus at 50° C. of each shoulder rubber is not less than 105% and not greater than 150% the complex elastic modulus at 50° C. of the crown rubber, and the 300% modulus at 50° C. of each shoulder rubber is not less than 105% and not greater than 150% the 300% modulus at 50° C. of the crown rubber.

8. The motorcycle tire according to claim 1, wherein the hardness at 100° C. of the crown rubber is 38 to 42 degrees, the complex elastic modulus at 100° C. of the crown rubber is 2.1 to 2.7 MPa, and the 300% modulus at 100° C. of the crown rubber is 4.0 to 4.8 MPa.

9. The motorcycle tire according to claim 8, wherein the hardness at 100° C. of each shoulder rubber is 40 to 44 degrees, the complex elastic modulus at 100° C. of each shoulder rubber is 2.4 to 3.0 MPa, and the 300% modulus at 100° C. of each shoulder rubber is 4.7 to 5.5 MPa.

10. The motorcycle tire according to claim 1, wherein, in a tire meridian cross-section in a 10 kPa state where the motorcycle tire is fitted on a standardized rim and inflated to an internal pressure of 10 kPa, a radius of curvature Rc of a ground-contact surface of the crown rubber is less than 95% of a tire cross-sectional width, and a radius of curvature Rb of a ground-contact surface of each shoulder rubber is larger than the radius of curvature Rc.

11. The motorcycle tire according to claim 1, wherein a development width of a ground-contact surface of the crown rubber is 80% to 120% of the development width of the band layer.

12. The motorcycle tire according to claim 1, wherein a development width of a ground-contact surface of the crown rubber is larger than the development width of the band layer.

13. The motorcycle tire according to claim 1, wherein the hardness at 100° C. of each shoulder rubber is not less than 105% and not greater than 125% the hardness at 100° C. of the crown rubber, the complex elastic modulus at 100° C. of each shoulder rubber is not less than 105% and not greater than 150% of the complex elastic modulus of the crown rubber, and the 300% modulus at 100° C. of each shoulder rubber is not less than 105% and not greater than 150% the 300% modulus at 100° C. of the crown rubber.

14. The motorcycle tire according to claim 1, wherein the band layer is composed of a jointless band, and the belt layer consists of the first ply and the second ply.

15. The motorcycle tire according to claim 1, wherein a development width a ground-contact surface of each shoulder rubber is 60% to 90% of a development width of the crown rubber, and the development width of the band layer is 20% to 80% of a development width the tread portion.

16. A motorcycle tire comprising:

a tread portion;

a pair of sidewall portions;

a pair of bead portions; and a carcass extending on and between the pair of bead portions, wherein the tread portion includes a tread reinforcing layer placed outward of the carcass in a tire radial direction, and a tread rubber placed outward of the tread reinforcing layer in the tire radial direction, the tread reinforcing layer includes a belt layer including a plurality of belt cords inclined with respect to a tire circumferential direction, and a band layer placed outward of the belt layer in the tire radial direction and including at least one band cord helically wound in the tire circumferential direction, a development width of the band layer is smaller than a development width of the belt layer, the tread rubber includes a crown rubber placed in a region including a tire equator, and shoulder rubbers each placed outward of the crown rubber in a tire axial direction in a region including a tread edge, a hardness at 100° C. of each shoulder rubber is higher than a hardness at 100° C. of the crown rubber, a complex elastic modulus at 100° C. of each shoulder rubber is higher than a complex elastic modulus at 100° C. of the crown rubber, a 300% modulus at 100° C. of each shoulder rubber is higher than a 300% modulus at 100° C. of the crown rubber, and the development width the band layer is 20% to 60% of the development width of the belt layer.

17. A motorcycle tire comprising:

a tread portion;

a pair of sidewall portions;

a pair of bead portions; and a carcass extending on and between the pair of bead portions, wherein the tread portion includes a tread reinforcing layer placed outward of the carcass in a tire radial direction, and a tread rubber placed outward of the tread reinforcing layer in the tire radial direction, the tread reinforcing layer includes a belt layer including a plurality of belt cords inclined with respect to a tire circumferential direction, and a band layer placed outward of the belt layer in the tire radial direction and including at least one band cord helically wound in the tire circumferential direction, a development width of the band layer is smaller than a development width of the belt layer, the tread rubber includes a crown rubber placed in a region including a tire equator, and shoulder rubbers each placed outward of the crown rubber in a tire axial direction in a region including a tread edge, a hardness at 100° C. of each shoulder rubber is higher than a hardness at 100° C. of the crown rubber, a complex elastic modulus at 100° C. of each shoulder rubber is higher than a complex elastic modulus at 100° C. of the crown rubber, a 300% modulus at 100° C. of each shoulder rubber is higher than a 300% modulus at 100° C. of the crown rubber, the belt layer includes a first ply and a second ply, a development width of the first belt ply and a development width of the second belt ply is 80% to 100% a development width of the tread portion, the first ply includes a first plurality of belt cords inclined in a first direction with respect to the tire circumferential direction, and the second ply includes a second plurality of belt cords inclined in a second direction opposite to the first direction with respect to the tire circumferential direction.

18. The motorcycle tire according to claim 17, wherein each of the belt cords of the first plurality and/or each of the belt cords of the second plurality are formed of a non-twisted single cord.

\* \* \* \* \*